United States Patent
Watkins, Jr.

(10) Patent No.: US 10,878,359 B2
(45) Date of Patent: Dec. 29, 2020

(54) SYSTEMS, METHODS, AND COMPUTER PROGRAM PRODUCTS FOR GENERATING A NORMALIZED ASSESSMENT OF INSTRUCTORS

(71) Applicant: East Carolina University, Greenville, NC (US)

(72) Inventor: Robert Todd Watkins, Jr., Chapel Hill, NC (US)

(73) Assignee: East Carolina University, Greenville, NC (US)

( * ) Notice: Subject to any disclaimer, the term of this patent is extended or adjusted under 35 U.S.C. 154(b) by 111 days.

(21) Appl. No.: 16/116,070

(22) Filed: Aug. 29, 2018

(65) Prior Publication Data

US 2019/0066022 A1   Feb. 28, 2019

Related U.S. Application Data

(60) Provisional application No. 62/552,667, filed on Aug. 31, 2017.

(51) Int. Cl.
*G06Q 10/06*   (2012.01)
*G06Q 50/20*   (2012.01)

(52) U.S. Cl.
CPC .  *G06Q 10/06393* (2013.01); *G06Q 10/06398* (2013.01); *G06Q 50/205* (2013.01)

(58) Field of Classification Search
CPC .............................. G06Q 40/06; G06Q 10/00
(Continued)

(56) References Cited

U.S. PATENT DOCUMENTS

| | | | |
|---|---|---|---|
| 6,676,413 B1 * | 1/2004 | Best | G09B 7/02 434/178 |
| 6,877,987 B2 | 4/2005 | Kulack | |

(Continued)

FOREIGN PATENT DOCUMENTS

| | | |
|---|---|---|
| JP | 11296061 | 10/1999 |
| JP | 2005157621 | 6/2005 |

(Continued)

OTHER PUBLICATIONS

Met Project; A Composite Measure of Teacher Effectiveness; published at http:// web.archive.org/web/20110806101836/http://www.metproject.org/downloads/Value-Add 100710.pdf; Aug. 6, 2011; 3 pages; METProject.org (Year: 2010).*

(Continued)

*Primary Examiner* — Romain Jeanty
(74) *Attorney, Agent, or Firm* — Myers Bigel, P.A.

(57) ABSTRACT

Systems, methods, and computer program products for generating a normalized assessment of instructors include calculating a first relative value unit (RVU) score for didactic instruction provided by the instructor, calculating a second RVU score for at least one of online instruction, seminar instruction, laboratory instruction, and/or simulation instruction provided by the instructor, calculating a third RVU score for practical experience instruction provided by the instructor, generating a normalized score for the instructor based on the first RVU score, the second RVU score, and the third RVU score, and displaying the normalized score for the instructor, where the first, second, and third RVU scores are each time-normalized scores.

20 Claims, 20 Drawing Sheets

(58) Field of Classification Search
USPC .............................................. 705/3–44, 7.39
See application file for complete search history.

(56) References Cited

U.S. PATENT DOCUMENTS

| | | | | |
|---|---|---|---|---|
| 8,187,004 | B1* | 5/2012 | DeSensi, Jr. ....... | G06Q 10/0639 434/365 |
| 2003/0180698 | A1 | 9/2003 | Salerian | |
| 2005/0196742 | A1 | 9/2005 | Harber | |
| 2006/0286539 | A1 | 12/2006 | Tidwell-Scheuring | |
| 2007/0031801 | A1 | 2/2007 | Tidwell-Scheuring | |
| 2008/0187898 | A1 | 8/2008 | Hattie | |
| 2009/0280460 | A1 | 11/2009 | Yaskin | |
| 2010/0316986 | A1 | 12/2010 | De La Chica | |
| 2011/0022972 | A1* | 1/2011 | McCoy ................... | G06F 16/29 715/764 |
| 2011/0212430 | A1* | 9/2011 | Smithmier ............... | G09B 7/00 434/322 |
| 2012/0141968 | A1 | 6/2012 | Li | |
| 2012/0208168 | A1 | 8/2012 | Atkinson | |
| 2014/0188574 | A1* | 7/2014 | Luca ......................... | G09B 7/00 705/7.39 |
| 2014/0349272 | A1* | 11/2014 | Kutty ....................... | G09B 5/08 434/362 |

FOREIGN PATENT DOCUMENTS

| | | |
|---|---|---|
| JP | 2008310787 | 12/2008 |
| KR | 20090096040 | 9/2009 |
| KR | 20100042636 | 4/2010 |
| KR | 101009380 | 1/2011 |
| WO | 2010066003 | 6/2010 |

OTHER PUBLICATIONS

Met Project; Working with Teachers to Develop Fair and Reliable Measures of Effective Teaching; published at http://web.archive.org/web/20110806101836/http://www.metproject.org/downloads/met-framing-paper.pdf; Aug. 6, 2011; 16 pages; Bill and Melinda Gates Foundation (Year: 2011).*

Chinese 2nd Office Action, dated Sep. 5, 2016, for corresponding Chinese Application No. 201280014075.4, including English translation (30 pages).

Examiner's Report, dated Aug. 21, 2018, for corresponding Canadian Application No. 2,830,075 (8 pages).

Extended European Search Report, dated Jul. 8, 2014, for corresponding European Application No. 12760399.1 (6 pages).

Notice of Final Rejection, dated Jul. 27, 2018, for corresponding Korean Application No. 10-2013-7027083, including English translation (12 pages).

Notice of Preliminary Rejection, dated Jan. 18, 2018, for corresponding Korean Application No. 10-2013-7027083, including English translation (28 pages).

PCT Search Report and Written Opinion, dated Nov. 30, 2012, for corresponding PCT International Application No. PCT/US2012/030037 (10 pages).

* cited by examiner

New Didactic Encounter

Encounter Number*

Short Description*

Start Date/Time*

End Date/Time*

Maximum RcVUs*

Section*

SoOM8950 - Assessment and Treatment 7 (17) - Section 001

* Indicates Required Field

⚠ All required fields have not been completed.

Cancel

Edit Individual Learning Objective

Number*

1

Microcompetency*

2608.002.100.100 - DNA Structure

Description*

Discuss organization and structure of human genome

ReVUs*

1

Encounter*

SoDM8110 - Foundational Biological Sciences 1 (20) - Section 001 - Encounter 001 - 8110.02.01 - Lecture: Introduction to Genetics Faculty Member*

Instructor 1

* Indicates Required Field

✓ All required fields have been completed.

Cancel  Save

Edit Simulation Encounter

Encounter Number*
8220.02.26

Faculty Group*
Instructor 1   Instructor 2

Faculty Lead*
Instructor 2                                                                                                    × ▾

Faculty Lead Credits Percentage*
20

Short Description*
Practical Experience: SKILLS EXERCISE – Scaling and Root Planing Start Date/Time*
Mar 28, 2017 - 01:00pm End Date/Time*
Mar 28, 2017 - 05:00pm Maximum ReVUs*
16

Section*
SoOMB120 – Dental Care Foundations 1 (20) – Section 001                                                         × ▾

* Indicates Required Field

✔ All required fields have been completed.

Cancel   Save

SoDM8120 - Dental Care Foundations 1 (20) - Section 001 - Encounter 8220.02.25 - Practical Experience: SKILLS EXERCISE – Scaling and Root Planing Simulation Encounter begins Tue, Mar 28, 2017 at 1:00 PM and ends Tue, Mar 28, 2017 at 5:00 PM Instructor 2 is the faculty leader.    Instructor 1 and Instructor 2 will also participate in this encounter.

Learning Objectives

| | MC Code | ReVUs |
|---|---|---|
| 1 | 5104.600.100.004 - Scaling and Root Planing | 16 |

Develop techniques for scaling and root planing in simulation experience

+ Add Learning Objectives

|  | Rank | Total | Percentage | D1234567 - Non-Surgical Periodontal Therapy |
|---|---|---|---|---|
| Summary Statistics | | | | |
| Total | | 16.0 | | 16.0 |
| Didactic | | 0 | 0.00% | 0 |
| Seminar | | 0 | 0.00% | 0 |
| Online | | 0 | 0.00% | 0 |
| Laboratory | | 0 | 0.00% | 0 |
| Simulation | | 16.0 | 100.00% | 16.0 |
| Practical Experience | | 0 | 0.00% | 0 |
| Instructor 2 | 1 | 9.60 | 60.00% | 9.60 |
| Didactic | | 0 | 0.00% | 0 |
| Seminar | | 0 | 0.00% | 0 |
| Online | | 0 | 0.00% | 0 |
| Laboratory | | 0 | 0.00% | 0 |
| Simulation | | 9.60 | 100.00% | 9.60 |
| Practical Experience | | 0 | 0.00% | 0 |
| Instructor 1 | 2 | 6.40 | 40.00% | 6.40 |
| Didactic | | 0 | 0.00% | 0 |
| Seminar | | 0 | 0.00% | 0 |
| Online | | 0 | 0.00% | 0 |
| Laboratory | | 0 | 0.00% | 0 |
| Simulation | | 6.40 | 100.00% | 6.40 |
| Practical Experience | | 0 | 0.00% | 0 |

SoDM8950 - Assessment and Treatment 7 (17) - Section 001 - Assessment 01 - QUANTITATIVE SKILLS ASSESSMENT- D4 Week 178 Clinic Session Details   Grading Summary   Grade Report + Add Scores ▾                                                                 ⊗ Delete Scores First   Previous   1   2   3   4   5   ...   Next   Last

| Student | Instructor | Date | Tieback ID | Microcompetency | ReVUs | |
|---|---|---|---|---|---|---|
| Student 1 | Instructor 1 | Thu, Jan 5 2017 | ecuaxium_165619 | 5104.150.400.210 - Periapical Radiographic Examination, General | 2.0 | |
| Student 1 | Instructor 1 | Thu, Jan 5 2017 | ecuaxium_165619 | 5104.150.400.220 - Bitewing Radiographic Examination, General | 1.0 | |
| Student 2 | Instructor 2 | Thu, Jan 5 2017 | ecuaxium_165290 | 5104.800.200.001 - Simple Extractions | 4.0 | |
| Student 3 | Instructor 3 | Thu, Jan 5 2017 | ecuaxium_166312 | 5104.150.200.200 - Limited Examination, General | 4.0 | |
| Student 4 | Instructor 4 | Thu, Jan 5 2017 | ecuaxium_165349 | 5104.400.400.002 - Resin Restorations | 10.0 | |
| Student 4 | Instructor 4 | Thu, Jan 5 2017 | ecuaxium_166400 | 5104.700.400.002 - Resin Base Partial Denture | 5.0 | |
| Student 4 | Instructor 4 | Thu, Jan 5 2017 | ecuaxium_166400 | 5104.700.400.002 - Resin Base Partial Denture | 5.0 | |
| Student 3 | Instructor 5 | Thu, Jan 5 2017 | ecuaxium_166469 | 5104.400.400.002 - Resin Restorations | 10.0 | |
| Student 5 | Instructor 6 | Thu, Jan 5 2017 | ecuaxium_165481 | 5104.400.400.002 - Resin Restorations | 10.0 | |
| Student 6 | Instructor 7 | Thu, Jan 5 2017 | ecuaxium_165511 | 5104.150.200.200 - Limited Examination, General | 4.0 | |

SoDM8950 - Assessment and Treatment 7 (17) - Section 001 - Encounter 01 - QUANTITATIVE SKILLS ASSESSMENT- D4 Week 178 Clinic Session

*Practical Experience Encounter begins Mon, Jan 2, 2017 at 12:00 AM and ends Sun, Jan 8, 2017 at 11:55 PM*

| Learning Objectives | Instructor | Microcompetency | ReVUs |
|---|---|---|---|
| | Instructor 1 | 5104.700.400.004 - Cast Metal Partial Denture | 3.83 |
| | Instructor 1 | 5104.150.200.200 - Limited Examination, General | 0.34 |
| | Instructor 1 | 5104.700.100.002 - Crown Restorations | 0.13 |
| | Instructor 1 | 5104.150.400.200 - Intraoral Radiographic Examinations, General | 0.19 |
| | Instructor 1 | 5104.150.400.210 - Periapical Radiographic Examination, General | 0.1 |
| | Instructor 1 | 5104.200.100.002 - Topical Fluoride Application | 0.1 |
| | Instructor 1 | 5104.150.200.300 - Comprehensive Examination, General | 1.02 |
| | Instructor 1 | 5104.800.200.001 - Simple Extractions | 0.17 |
| | Instructor 1 | 5104.700.400.002 - Resin Base Partial Denture | 0.64 |
| | Instructor 1 | 5104.200.100.001 - Dental Prophylaxis | 0.1 |
| | Instructor 1 | 5104.400.400.002 - Resin Restorations | 0.17 |
| | Instructor 1 | 5104.150.400.220 - Bitewing Radiographic Examination, General | 0.1 |
| | Instructor 1 | 5104.100.200.000 - Dental Behavior Management, General | 0.1 |
| | Instructor 1 | 5104.100.200.200 - Nutritional Behavior Management, General | 0.13 |
| | Instructor 2 | 5104.150.200.200 - Limited Examination, General | 1.36 |
| | Instructor 2 | 5104.400.400.002 - Resin Restorations | 2.38 |
| | Instructor 2 | 5104.150.400.210 - Periapical Radiographic Examination, General | 0.38 |
| | Instructor 2 | 5104.700.300.002 - Complete Denture and Overdenture | 1.79 |
| | Instructor 2 | 5104.400.400.001 - Amalgam Restorations | 0.47 |

SYSTEMS, METHODS, AND COMPUTER PROGRAM PRODUCTS FOR GENERATING A NORMALIZED ASSESSMENT OF INSTRUCTORS

RELATED APPLICATIONS

This non-provisional patent application claims priority to U.S. provisional patent application 62/552,667, filed Aug. 31, 2017, entitled "Systems, Methods, And Computer Program Products For Generating A Normalized Assessment Of Instructors," the disclosure of which is incorporated herein in its entirety by reference.

FIELD OF THE INVENTION

The invention relates to systems, methods, and computer program products, and more specifically to computer systems that can generate an automated assessment of instructors performing various types of educational encounters.

BACKGROUND

In academic environments, an assessment of an instructor can assist in determining both the competence of the instructor as well as the instructor's overall contribution to the academic program.

For example, in academic environments which utilize accreditation, the academic environment (e.g., a college or university) may be required to submit information related to the academic environment in order to achieve or maintain the accreditation. The submitted information may include data which assists the accreditation organization with determining whether the academic environment is achieving its education goals. The number of hours of instruction provided by the instructor may be a factor in determining whether the academic program is achieving its education goals. While hours spent in the classroom may be utilized as an objective factor in an instructor evaluation, often such coarse measures do not reflect the full contribution of the instructor to the academic program. For example, opportunities in which the instructor provides demonstrations and/or other types of non-traditional learning environments may be difficult to quantify.

SUMMARY

Various embodiments described herein provide methods, systems, and computer program products for generating normalized assessments of instructors.

According to some embodiments described herein, a system for generating a normalized assessment of an instructor includes a processor, a display coupled to the processor, and a memory coupled to the processor and storing computer readable program code that when executed by the processor causes the processor to perform operations including calculating a first relative value unit (RVU) score for didactic instruction provided by the instructor, calculating a second RVU score for at least one of online instruction, seminar instruction, laboratory instruction, and/or simulation instruction provided by the instructor, calculating a third RVU score for practical experience instruction provided by the instructor, generating a normalized score for the instructor based on the first RVU score, the second RVU score, and the third RVU score, and displaying, via a graphical interface on the display, the normalized score for the instructor, where the first, second, and third RVU scores are each time-normalized scores.

According to some embodiments described herein, a method for generating a normalized assessment of an instructor includes calculating a first relative value unit (RVU) score for didactic instruction provided by the instructor, calculating a second RVU score for at least one of online instruction, seminar instruction, laboratory instruction, and/or simulation instruction provided by the instructor, calculating a third RVU score for practical experience instruction provided by the instructor, generating a normalized score for the instructor based on the first RVU score, the second RVU score, and the third RVU score, and displaying the normalized score for the instructor, where the first, second, and third RVU scores are each time-normalized scores.

According to some embodiments described herein, a computer program product for operating an imaging system includes a non-transitory computer readable storage medium having computer readable program code embodied in the medium that when executed by a processor causes the processor to perform operations including calculating a first relative value unit (RVU) score for didactic instruction provided by an instructor, calculating a second RVU score for at least one of online instruction, seminar instruction, laboratory instruction, and/or simulation instruction provided by the instructor, calculating a third RVU score for practical experience instruction provided by the instructor, generating a normalized score for the instructor based on the first RVU score, the second RVU score, and the third RVU score, and displaying the normalized score for the instructor, where the first, second, and third RVU scores are each time-normalized scores, where the first, second, and third RVU scores are each time-normalized scores.

In some embodiments, the didactic instruction comprises one or more encounters in which the instructor communicates directly to a plurality of students.

In some embodiments, the online instruction comprises one or more encounters in which a computer is a mechanism for delivery of content to a plurality of students, the seminar instruction comprises one or more encounters in which the seminar instruction guides discussions between one or more experts and the plurality of students, the laboratory instruction comprises one or more encounters that places a student of the plurality of students into the role of performing one or more tasks of a skill that augment an understanding of didactic knowledge of the skill, and the laboratory instruction comprises one or more encounters that places a student of the plurality of students into the role of performing one or more tasks of a skill that augment an understanding of didactic knowledge of the skill.

In some embodiments, the practical experience instruction comprises one or more encounters in which a student performs one or more tasks of a skill on a human patient under conditions corresponding to conditions experienced by those employed to perform the skill.

In some embodiments, the second and third RVU scores are based on a pre-defined assessment of difficulty and an estimated time for a student to complete a respective experiential task.

In some embodiments, calculating the first RVU score for the didactic instruction provided by the instructor includes defining learning objectives for respective ones of a plurality of didactic encounters, associating the learning objectives of the respective ones of the plurality of the didactic encounters with RVU quantities, and summing the RVU quantities for the plurality of the didactic encounters to determine the first RVU score.

In some embodiments calculating the second RVU score for at least one of the online instruction, the seminar instruction, the laboratory instruction, and/or the simulation instruction provided by the instructor includes assigning a percentage credit for the instructor in respective ones of a plurality of online, seminar, laboratory, and/or simulation encounters, defining learning objectives for the respective ones of the plurality of the online, seminar, laboratory, and/or simulation encounters, associating the learning objectives of the respective ones of the plurality of the online, seminar, laboratory, and/or simulation encounters with RVU quantities, for each of the plurality of the online, seminar, laboratory, and/or simulation encounters, determining an allocated RVU quantity for the instructor based on the associated RVU quantities for the learning objectives of the online, seminar, laboratory, and/or simulation encounter and the assigned percentage credit for the instructor in the online, seminar, laboratory, and/or simulation encounter, and summing the allocated RVU quantities for the instructor for respective ones of the plurality of the online, seminar, laboratory, and/or simulation encounters to determine the second RVU score.

In some embodiments, calculating the third RVU score for the practical experience instruction provided by the instructor includes providing input for qualitative assessment data for respective ones of a plurality of practical experience encounters in which the instructor participates, calculating practical experience RVUs for the respective ones of the plurality of the practical experience encounters based on the qualitative assessment data, and summing the practical experience RVUs for the plurality of the practical experience encounters to determine the third RVU score. In some embodiments, the qualitative assessment data for the respective ones the plurality of the practical experience encounters includes one or more learning objectives associated with at least one skill performed during the practical experience encounter and RVU values assigned to respective ones of the learning objectives. Calculating practical experience RVUs for the respective ones of the plurality of the practical experience encounters based on the qualitative assessment data may include calculating, for each skill of the at least one skill performed during the practical experience encounter, a per-skill RVU value based on a product of a number of students that performed the skill times the RVUs assigned to the one or more learning objectives associated with the skill, calculating a sum of the per-skill RVU values, and dividing the sum of the per-skill RVU values by a total number of the students that participated in the practical experience encounter to determine the practical experience RVUs for the practical experience encounter.

In some embodiments, the instructor is a first instructor of a plurality of instructors, and the methods, systems, and computer program products further include calculating the normalized score for each instructor of the plurality of instructors, generating a normalized report comprising the normalized score for each instructor of the plurality of instructors, and transmitting the normalized report as part of an accreditation process for an educational institution. In some embodiments, the normalized report further includes the first RVU score, the second RVU score, and the third RVU score for each instructor of the plurality of instructors. In some embodiments, the first RVU score, the second RVU score, and the third RVU score for each instructor include subtotals based on learning objectives, and the normalized report further comprises the subtotals based on the learning objectives for each of the first RVU score, the second RVU score, and the third RVU score.

It is noted that aspects of the inventive concepts described with respect to one embodiment, may be incorporated in a different embodiment although not specifically described relative thereto. That is, all embodiments and/or features of any embodiment can be combined in any way and/or combination. Other operations according to any of the embodiments described herein may also be performed. These and other aspects of the inventive concepts are described in detail in the specification set forth below.

BRIEF DESCRIPTION OF THE FIGURES

The above and other objects and features will become apparent from the following description with reference to the following figures, wherein like reference numerals refer to like parts throughout the various figures unless otherwise specified.

FIG. 3 is an example of a user interface for the creation of a record for a didactic encounter, according to various embodiments described herein.

FIG. 4 is an example of a user interface for the creation of an example record that maps learning objectives for a didactic encounter, according to various embodiments as described herein.

FIG. 8 is an example of a user interface for allocating and/or editing a faculty credit percentage for a simulation encounter, according to various embodiments described herein.

FIG. 9 is an example of a user interface displaying a simulation encounter record with at least one learning objective defined for the simulation encounter, according to various embodiments as described herein.

FIG. 10 is an example of a user interface displaying an example report of an allocation of the simulation encounter of FIG. 9, according to various embodiments as described herein.

FIG. 13 is an example of a user interface displaying an example set of quantitative assessment data for an example set of practical experiences, according to various embodiments as described herein.

FIG. 14 is an example of a user interface presenting an example allocation of RVUs for instructors for a practical experience encounter (clinical session) with multiple micro-competencies, according to various embodiments as described herein.

FIGS. 15-19 are example user interfaces displaying examples of aggregation reports that can be generated from the collected data, according to various embodiments as described herein.

DETAILED DESCRIPTION

Figure 1:
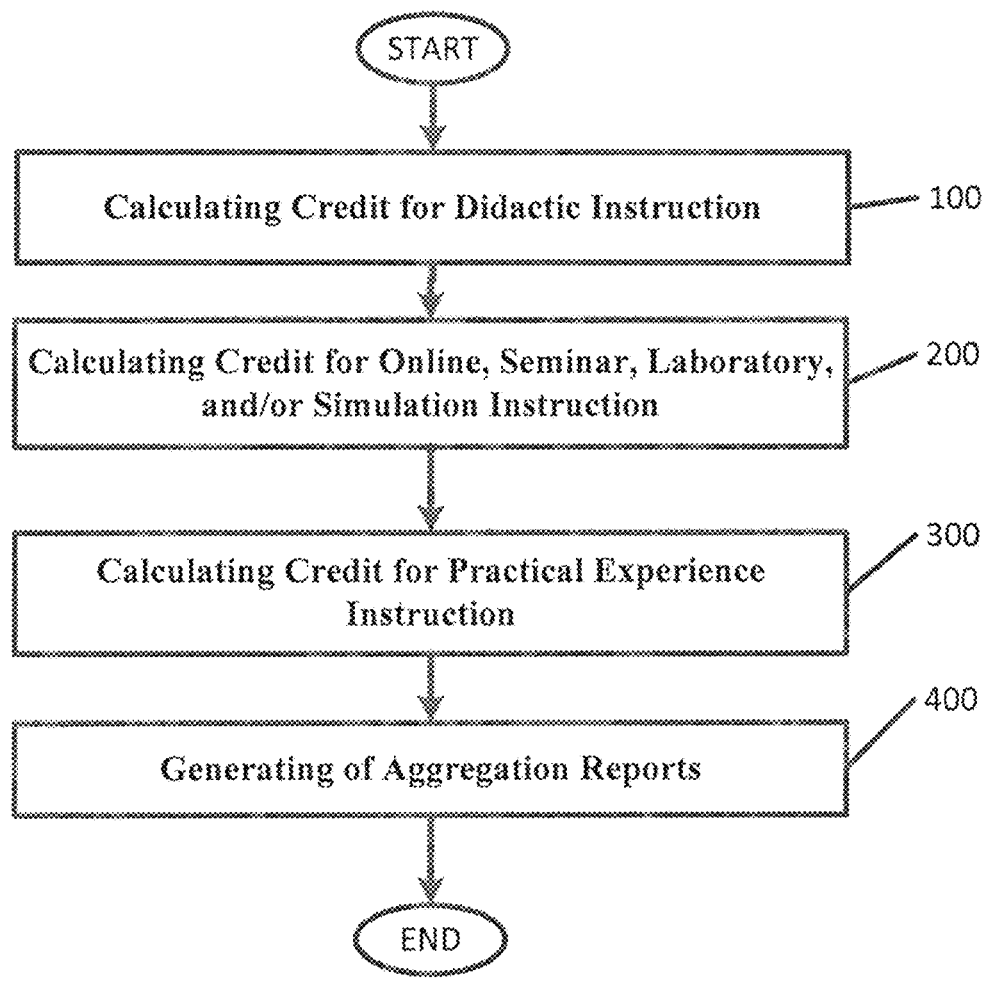
FIG. 1 is a flowchart that illustrates example operations in a method for generating a normalized assessment of an instructor, according to various embodiments described herein.

The present invention will now be described more fully hereinafter with reference to the accompanying figures, in which preferred embodiments of the invention are shown. This invention may, however, be embodied in many different forms and should not be construed as limited to the embodiments set forth herein. Like numbers refer to like elements throughout.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms first, second, etc. may be used herein to describe various elements, components, regions, features, steps, layers and/or sections, these elements, components, features, steps, regions, layers and/or sections should not be limited by these terms. These terms are only used to distinguish one element, component, feature, step, region, layer or section from another region, layer or section. Thus, a first element, component, region, layer, feature, step or section discussed below could be termed a second element, component, region, layer, feature, step or section without departing from the teachings of the present invention. The sequence of operations (or steps) is not limited to the order presented in the claims or figures unless specifically indicated otherwise.

As will be appreciated by one skilled in the art, aspects of the present invention may be illustrated and described herein in any new and useful process, machine, manufacture, or composition of matter, and/or any new and useful improvement thereof. Accordingly, aspects of the present invention may be implemented entirely in hardware, entirely in software (including firmware, resident software, micro-code, etc.) or combining software and hardware implementations that may all generally be referred to herein as a "circuit," "module," "component," or "system." Furthermore, aspects of the present invention may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present invention are described herein with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The term "(curriculum) encounter" refers to an education experience and/or encounter that involves instructors and a cohort of students.

The term "didactic (type) encounter" refers to an encounter where an instructor communicates to a group that is to be instructed (e.g., students in a class). Video recordings of presentations may fall in this category. Didactic instruction refers to one or more of such didactic encounters. The didactic encounter can be associated with a single instructor.

The term "online (type) encounter" refers to an encounter where a computer (e.g., via intranet or intranet) is the mechanism for delivery of content to students. An online encounter may differ from asynchronous delivery of a presentation in that the online encounter may involve direct navigation by a respective student using a computer. Multiple instructors may be involved in the instruction of an online (type) encounter to subsets of the class, the entire class, and/or subsets of students of more than one class on the same topics. Online instruction refers to one or more of such online encounters.

The term "seminar (type) encounter" refers to an encounter that primarily involves guided discussions between experts/teachers and students. This may include a multitude of interactive techniques including, for example, flipped class room, case-based learning, and/or problem-based learning. Multiple instructors may be involved in the seminar encounter to subsets of the class, the entire class, and/or subsets of students of more than one class on the same topics. Seminar instruction refers to one or more of such seminar encounters.

Program training on laboratory sciences can include simulation encounters, laboratory encounters, and/or practical experience encounters. The term "simulation (type) encounter" refers to an encounter that places the student into a role of performing a task or tasks that approximate an actual work or skill that will be performed by the graduate of the program during their job or profession. For medical disciplines, this may involve, for example, performing surgeries on simulated patients. Multiple instructors may be involved in the simulation encounter to subsets of the class or the entire class on the same topics. Simulation instruction refers to one or more of such simulation encounters.

The term "laboratory (type) encounter" refers to an encounter that places the student into a role of performing a task or tasks that augment the understanding of didactic knowledge. Multiple instructors may be involved in the laboratory encounter to subsets of the class or the entire class on the same topics. Laboratory instruction refers to one or more of such laboratory encounters.

The term "practical experience (type) encounter" refers to an encounter where the student performs the actual task or tasks that they will be performing in the same or similar conditions as they will perform them following graduation in their job or profession. In medical disciplines, for example, this may include performing surgery on actual patients. Practical Experience instruction refers to one or more of such practical experience encounters.

The term "microcompetency code" refers to a detailed code for assigning topics to encounters for mapping to program competencies. There may be four levels of hierarchy—(1) Discipline, (2) Topic, (3) Subtopic, and (4) Microcompetency Code. An example is as follows:

Discipline: 2604—Cellular Biology and Anatomical Sciences
Topic: 2604.009—Gross Anatomy (Human)
Subtopic: 2604.009.200—Skeleton Gross Anatomy
Microcompetency: 2604.009.200.210—Cervical Vertebrae The term "program (curriculum) competency" refers to a set of topics that are tracked across all courses of a program to be encountered and successfully assessed to reach "competence" as a predictor of performing well following graduation. From a viewpoint of encounter mapping, a single competency can include a single micro competency, but, in some embodiments, may include many microcompetency codes. An example is as follows:

Competency SoDM20—Patient Assessment
Microcompetency: 5104.150.000.000—Dental Diagnostic Sciences, General
Microcompetency: 5104.150.100.100—Microbiology Cultures and Tests, General
Microcompetency: 5104.150.100.200—Genetic Tests, General
Microcompetency: 5104.150.100300—Salivary Tests, General
Microcompetency: 5104.150.100.400—Tissue Examinations, General
Microcompetency: 5104.150.200.000—Dental Clinical Examinations and Tests, General
Microcompetency: 5104.150.200.100—Patient Screening, General
Microcompetency: 5104.150.200.200—Limited Examination, General
Microcompetency: 5104.150.200.210—Caries Susceptibility Examination, General
Microcompetency: 5104.150.200.220—Pulp Vitality Examination, General
Microcompetency: 5104.150.200300—Comprehensive Examination, General
Microcompetency: 5104.150.200.400—Case Re-examination/Outcomes Assessment, General
Microcompetency: 5104.150.300.000—Dental Diagnostic Casts and Models, General
Microcompetency: 5104.150.300.100—Diagnostic Waxup, General
Microcompetency: 5104.150.400.200—Intraoral Radiographic Examinations, General
Microcompetency: 5104.150.400.000—Oral Radiographic Examinations, General
Microcompetency: 5104.150.400.210—Periapical Radiographic Examination, General
Microcompetency: 5104.150.400.220—Bitewing Radiographic Examination, General
Microcompetency: 5104.150.400.230—Occlusal Radiographic Examination, General
Microcompetency: 5104.150.500.000—Oral Photographic Examinations, General
Microcompetency: 5104.150.400.100—Extraoral Radiographic Examinations, General
Microcompetency: 5104.150.400.110—Panoramic Radiographic Examinations, General
Microcompetency: 5104.150.400.120—Skull/Cephalometric Radiographic Examinations, General
Microcompetency: 5104.150.400.130—Tomographic Radiographic Examinations, General
Microcompetency: 5104.150.400.140—Sialographic Radiographic Examinations, General
Microcompetency: 5104.150.400.150—Temporomandibular Joint Radiographic Examinations, General
Microcompetency: 5104.150.400.160—Ultrasound Radiographic Examinations, General The term "relative (educational) value unit" (RVU or ReVU) refers to a point system based on a common heuristic across all encounter and assessment types. While the basis of relative value can be based on anything, in some embodiments, the basis is time. When normalizing an encounter, mapping time of the encounter may be defined. As an example, in some embodiments, 15 minutes may be equal to 1 point. Alternatively, in some embodiments, 60 minutes may be equal to 1 point. By assigning points to time, the data from the encounter maps can be compared to assessment points. Relative value units are described in commonly assigned U.S. patent application Ser. No. 13/425,627, filed on Mar. 21, 2012, the contents of which are incorporated herein by reference. In some embodiments, some RVUs may be based on a pre-defined assessment of difficulty and an estimated time to complete a respective experiential task.

The term "cohort" refers to a set of students who begin an educational program at the same time (e.g., same semester, term, or academic year). While graduation date/year may be implied by the start date, some students drop out of the program early or fail components and graduate late. Cohort evaluation is useful for program analysis because it may be used to look at the achievement of multiple students encountering the same instruction. Cohort analysis may follow the same student and/or cohort across multiple academic years. Cross-cohort analysis may allow for encounter analysis for multiple cohorts.

The term "academic year" refers to the program-defined start and finish of academic activity. For example, a program may begin in the Fall Term and end at the end of the Summer Term(s). Academic year evaluation is useful for program analysis because it may be used to look at faculty performance while instructing students in multiple cohorts that happen during the same time span. Cross-academic year analysis may allow for encounter analysis for multiple years.

The present invention utilizes systems, methods, and computer program products to provide academic credit to instructors across a wide range of educational encounter types. The comparisons described herein also allow for the normalization across the various types of encounters to provide an objective means of comparison across a plurality of instructors. These methods, systems, and computer program products described herein promote technical efficiency within the review process. For example, objective means of determining academic credit may allow for automation of the generation of accreditation reports. Because the credit may be easily quantified and compared, the generation of reports required for accreditation may be performed with minimum human input. This may allow for a repeatable process that reduces errors, improves efficiency, minimizes and/or reduces resources required for accreditation, and improves transparency in instructor evaluation. Such methods, systems, and computer program products provide a reduction in technical and personnel resources required for instructor evaluation. In addition, the methods, systems, and computer program products described herein provide an improved technical process to accomplish accreditation for an educational institution. For example, the accreditation of schools, programs, colleges, and universities relies on accurate curriculum mapping data. In the past, educational programs primarily relied solely on the number of lectures to provide curriculum information, but competency-based education emphasizes that all types of instruction be properly mapped. Such a mapping is technically difficult to achieve in a conventional environment. The techniques described herein allow for real-time analysis of the effects of instruction change on student performance, and can automatically provide the data used for accreditation. Thus, the methods, systems, and computer program products described here are not only more efficient than conventional means of curriculum reporting, but they also provide a level of accuracy in the reporting that was not previously available.

FIG. 1 illustrates a method for generating a normalized assessment of an instructor, according to various embodiments described herein. As illustrated in FIG. 1, a method for generating a normalized assessment of an instructor may include calculating credit for didactic instruction (block 100), calculating credit for online, seminar, laboratory, and/or simulation instruction (block 2000, calculating credit for practical experience instruction (block 300), and generating aggregation reports associated with the calculated credits (block 400). Though the method describes multiple types of education encounters, it will be understood that not all assessments will involve each type of encounter. For example, some assessments may include online encounters, but not laboratory or simulation. Similarly, some assessments may include reviews of didactic instruction and practical experiences, but not online, seminar, laboratory, and/or simulation instruction. Various combinations of educational encounters may be combined, included, or excluded from the present methods, systems, and compute program products without deviating from the present invention.

Calculating Credit for Didactic Instruction (Lecture)

Figure 2:
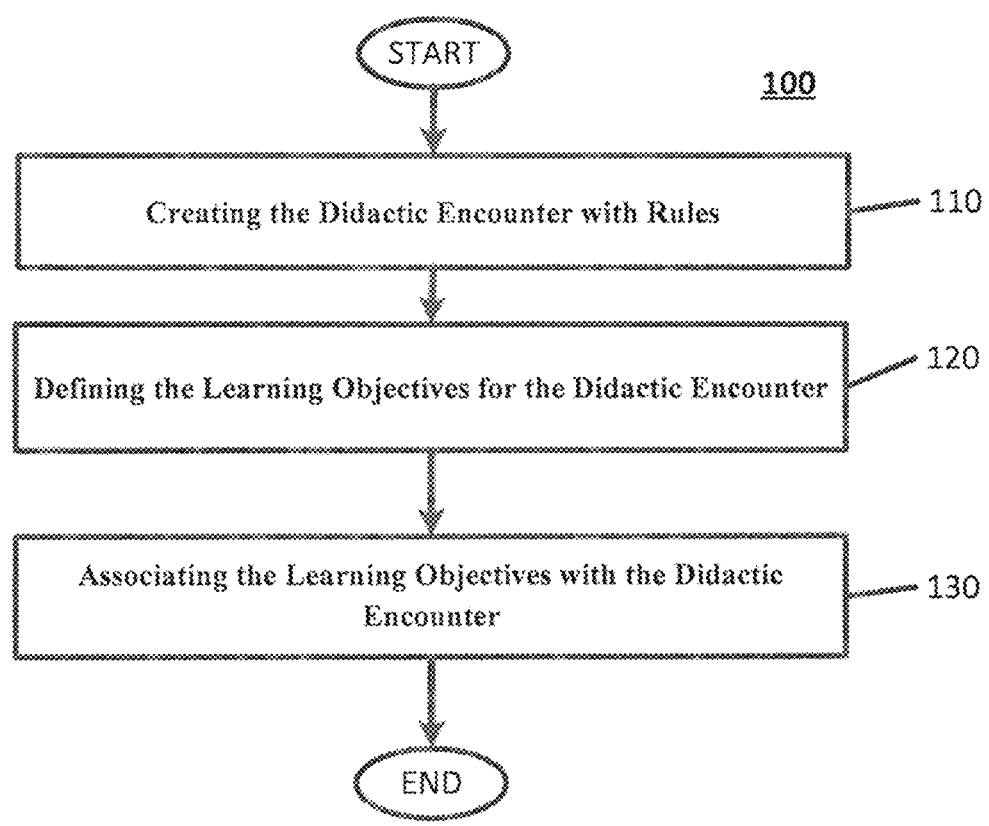
FIG. 2 is a flowchart that illustrates example operations in a method for calculating academic credit for a didactic encounter associated with didactic instruction, according to various embodiments described herein.

Methods, systems, and compute program products according to the present invention may include calculating credit for didactic instruction (block 100, FIGS. 1 and 2). Calculating credit for didactic instruction may include calculating credit for one or more didactic encounters. FIG. 2 illustrates a method for calculating academic credit for a didactic encounter associated with didactic instruction, according to various embodiments described herein. As illustrated in FIG. 2, giving credit for a didactic encounter may include additional sub-operations (blocks 110, 120, 130), as described further herein.

Creating the Didactic Encounter with Rules

A didactic encounter may be created with reference to particular mapping rules. In some embodiments, a user interface of an electronic device may be used to create a record for the didactic encounter (FIG. 2, block 110). The didactic encounter may be the normalization reference standard for encounter mapping. For example, in some embodiments, instruction performed in other types of encounters (e.g., online, laboratory, etc.) may be compared to an equivalent level of instruction in a didactic encounter.

A didactic encounter may be created based on a number of rules. First, the encounter may happen at a specific date and time. Second, during a didactic encounter, one instructor may speak about a single topic at a time for a defined amount of time. In some embodiments, it is possible for more than one instructor to lecture during the same encounter. However, in a lecture, one instructor may speak at a time to the entire class. The details of the participating instructor may be managed by the mapping of learning objectives. FIG. 3 illustrates an example of a user interface 390 for the creation of a record for a didactic encounter, according to various embodiments described herein. As illustrated in FIG. 3, a particular number of RVUs may be assigned to the didactic encounter based on the duration of the didactic encounter. For example, if one RVU corresponds to an equivalent of 15 minutes of instruction, a one hour didactic encounter may be assigned four RVUs.

Defining the Learning Objectives

Learning objectives may be defined with respect to the didactic encounter (FIG. 2, block 120). In some embodiments, the learning objectives may be associated with the record created on an electronic device in block 110. Again, for a didactic encounter the learning objective may be directly assigned to a single (identified) instructor. The mapping may be done directly in the learning objective. FIG. 4 illustrates an example of a user interface 490 for the creation of an example mapping for learning objectives a didactic encounter, according to various embodiments as described herein. As illustrated in FIG. 4, the learning objective may be defined (e.g., "Discuss organization and structure of human genome") and numbered. In some embodiments, the learning objective may be connected to a Microcompetency Code. The estimated amount of time may be translated to a RVU (e.g., 15 minutes equals 1 RVU). Finally, the faculty member may be associated with the learning objective.

Associating the Learning Objectives with the Didactic Encounter

Figure 5:
FIG. 5 is an example of a user interface displaying a didactic encounter record with a plurality of learning objectives defined for the didactic encounter, according to various embodiments as described herein.

The learning objectives for a particular didactic encounter may be generated to define all of the learning objectives available for the didactic encounter (FIG. 2, block 130). FIG. 5 illustrates an example of a user interface 590 displaying a didactic encounter record with a plurality of learning objectives defined for the didactic encounter, according to various embodiments as described herein. As illustrated in FIG. 5, an example one hour lecture may cover four different topics by the same instructor for 15 minutes for each topic. Accordingly, as illustrated in the example, each topic may receive one RVU allocation. Again, it is possible that more than one instructor lectures in the same hour. However, in some embodiments, the didactic encounter may be defined by each instructor speaking to the entire class individually.

For a given didactic encounter, calculating the credit provided to the instructor for a given didactic encounter may involve the summation of the RVUs associated with each learning objective of the didactic encounter. Calculating the credit provided to the instructor for didactic instruction may involve summing the credit provided for each of the didactic encounters in which the instructor participates.

Figure 6:
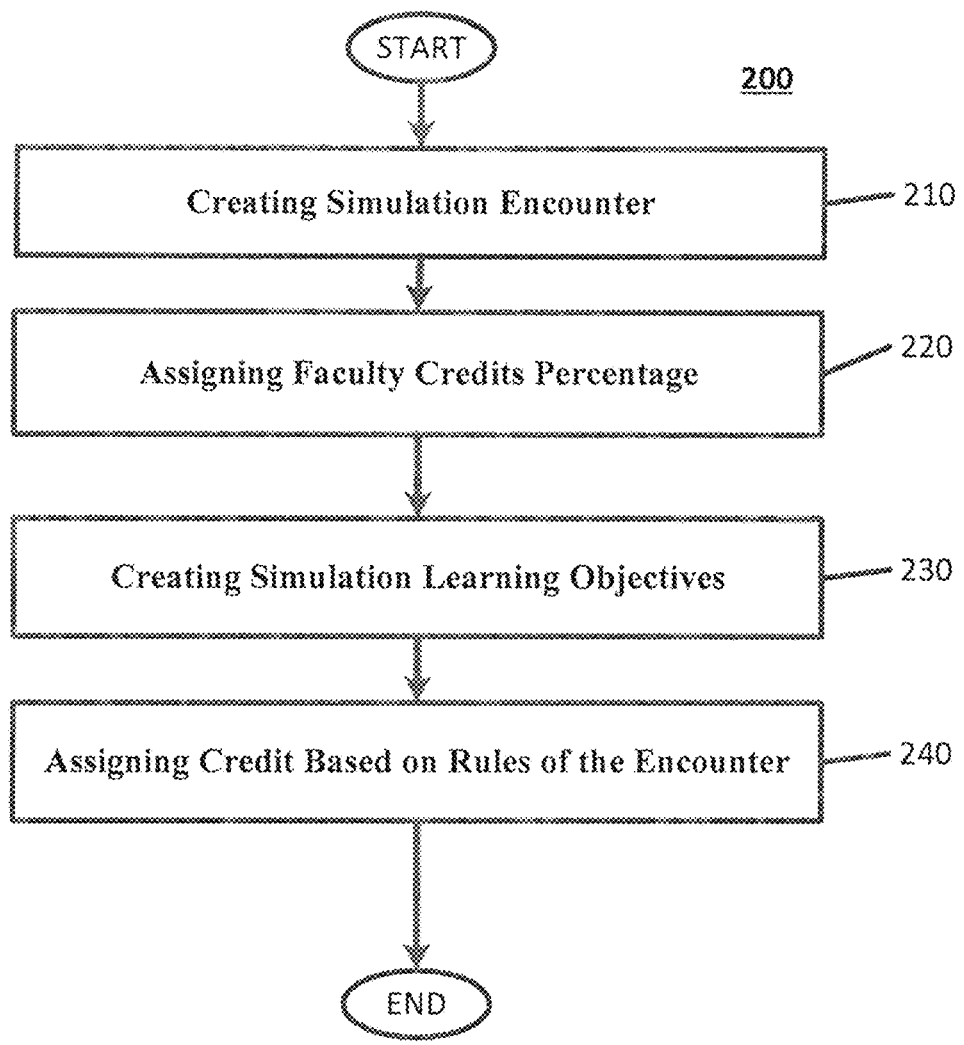
FIG. 6 is a flowchart that illustrates example operations in a method for calculating academic credit for a simulation encounter associated with simulation instruction, according to various embodiments described herein.

Calculating Credit for Online, Seminar, Laboratory, and/or Simulation Instruction Referring back to FIG. 1 (in block 200) methods, systems, and computer program products according to the present invention may include calculating credit for online, seminar, laboratory, and/or simulation instruction. From a curriculum mapping perspective, the online, seminar, laboratory and simulation encounters may each be mapped in a same or similar way even though the nature of the encounters are different. In these four encounter types, there may be more than one instructor working with the students at the same time. This differs from some types of didactic instruction (e.g., a lecture) where only one instructor may work with the entire class at a time. For example purposes, the simulation encounter will be used as a representative example for the online, seminar, laboratory, and simulation encounters described herein. However, it will be understood by those of skill in the art that the method used for the simulation encounter type may also be used for the online, laboratory, and/or simulation encounter types similarly. Calculating credit for simulation instruction may include calculating credit for one or more simulation encounters. FIG. 6 illustrates a method for calculating academic credit for an online, laboratory, and/or simulation encounter associated with online, laboratory, and/or simulation instruction, according to various embodiments described herein. As illustrated in FIG. 6, calculating academic credit for the simulation encounter may include additional sub-operations (blocks 210, 220, 230, and 240), as described further herein.

Creating Simulation Encounter

Figure 7:
FIG. 7 is an example of a user interface for the creation of a record for a simulation encounter, according to various embodiments described herein.

A record of the simulation encounter may be created (FIG. 6, block 210). In a similar manner as was described with respect to the didactic encounter, the simulation encounter may be numbered and described with its date range. There are at least three differences between the simulation type encounter and the didactic type encounter. First, with the simulation type encounter, a Faculty Group may define all of the instructors involved. Second, a Faculty Lead may identify the instructor who leads the simulation encounter. Third, a Faculty Lead Credits Percentage may define the percentage (out of 100) that is credited to the Faculty Lead for their work that is over and above the others in the Faculty Group for leading the simulation encounter. By making the Faculty Lead Credits Percentage equal to 0, it is the same as making all instructors equal. FIG. 7 illustrates an example of a user interface 790 for the creation of a record for a simulation encounter, according to various embodiments described herein.

In some embodiments, it may be possible for the Faculty Lead to create the simulation encounter and not participate in the simulation encounter itself. In such an embodiment, the Faculty Group may not include the Faculty Lead. This may mean that the Faculty Lead receives credit only for the percentage in the Faculty Lead Credits Percentage but would not split the RVUs from the group.

Assigning Faculty Credits Percentage

A credit percentage for the educational encounter may be assigned to the faculty members involved (FIG. 6, block 220). FIG. 8 illustrates an example of a user interface 890 for the allocating and/or editing a faculty credit percentage for a simulation encounter, according to various embodiments described herein. In FIG. 8, an example allocation is made for a simulation encounter related to "scaling and root planing." As illustrated in the example of FIG. 8, there are two instructors in this simulation encounter, and one (Instructor 2) has been assigned as the Faculty Lead. The Faculty Lead is given 20% credit as lead, leaving 80 percent to the RVUs to be split equally between both instructors (Instructors 1 and 2). Since the encounter only includes one other instructor (Instructor 1), the instructor performing the Faculty Lead role (Instructor 2) gets the 20% credit as lead, plus one half of the remaining credit, for a total of 60% (20% plus 40%). The other instructor (Instructor 1) would receive 40%.

Creating Simulation Learning Objectives

The learning objectives of the simulation may be created and assigned to the encounter (FIG. 6, block 230). FIG. 9 illustrates an example of a user interface 990 displaying a simulation encounter record with at least one learning objective defined for the simulation encounter, according to various embodiments as described herein. Though FIG. 9 illustrates only a single objective, the present invention is not limited thereto. Similarly to the didactic encounter, the learning objective(s) may be created with microcompetencies and RVUs. One difference between the didactic encounter and the simulation is that the simulator assignments are assigned to the encounter and not the individual instructor. As illustrated in FIG. 9, there is only one learning objective with one microcompetency and 16 RVUs to be divided based on the rules of the encounter as previously defined (FIG. 6, block 220).

Assigning Credit Based on Rules of the Encounter:

The credit from the simulation encounter may be respectively assigned to the participating faculty (FIG. 6, block 240). In some embodiments, this allocation may occur after the educational encounter is complete, though the present invention is not limited thereto. FIG. 10 illustrates an example of a user interface 1090 displaying an example report of an allocation of the simulation encounter of FIG. 9, according to various embodiments as described herein. As illustrated in FIG. 10, from the rules of the simulation encounter, 20% of the 16 RVUs are automatically assigned to the lead instructor, and then the remaining 80%/o is split equally. This yields a reporting of 60% of the RVUs from the encounter (9.6 RVUs) to the Faculty Lead (Instructor 2) and the remaining 40% (6.4 RVUs) to the other faculty member in the group (Instructor 1).

For a given simulation encounter, calculating the credit provided to the instructor may involve the summation of the RVUs associated with each learning objective of the simulation encounter as allocated based on the rules of the simulation encounter. Calculating the credit provided to the instructor for simulation instruction may involve summing the credit provided for each of the simulation encounters in which the instructor participates.

Calculating Credit for Practical Experience Instruction

Figure 11:
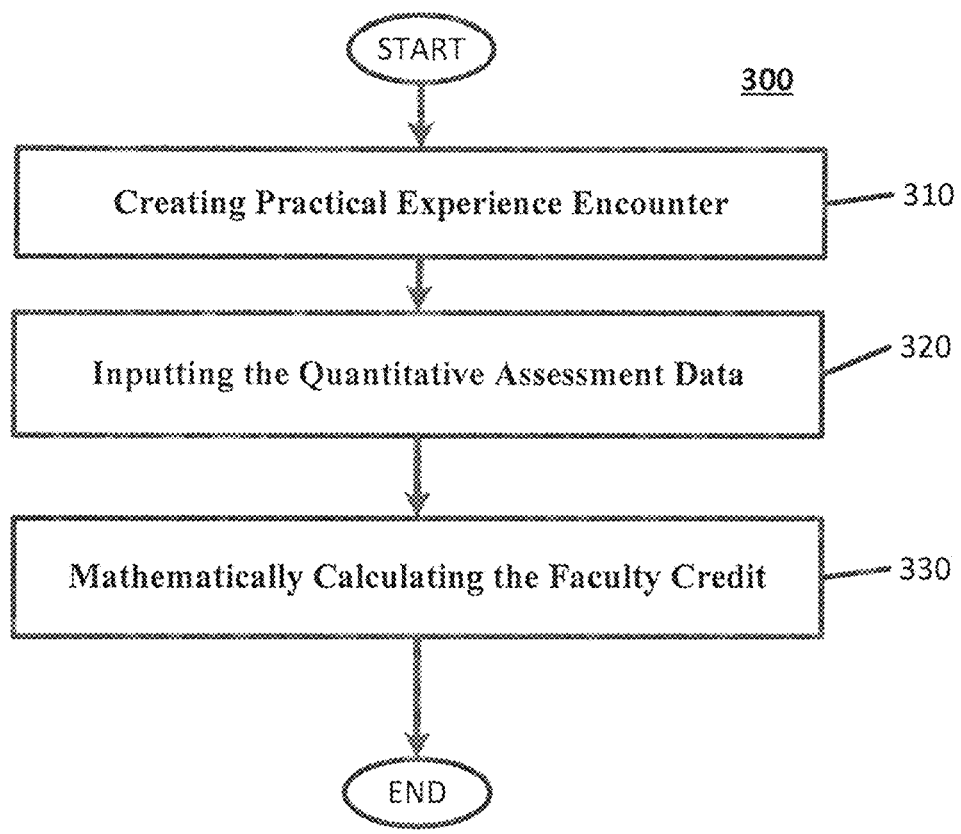
FIG. 11 is a flowchart that illustrates example operations in a method for calculating academic credit for a practical experience encounter associated with practical experience instruction, according to various embodiments described herein.

Methods, systems, and computer program products according to the present invention may include calculating credit for practical experience instruction (FIG. 1, block 300). Calculating credit for practical experience instruction may include calculating credit for one or more practical experience encounters. FIG. 1 illustrates a method for calculating academic credit for a practical experience encounter associated with practical experience instruction, according to various embodiments described herein. As illustrated in FIG. 11, giving credit for the practical experience encounter type may include additional sub-operations (blocks 310, 320, 330), as described further herein.

Creating Practical Experience Encounter

To give credit for a given practical experience encounter, a record of the practical experience encounter may be created (FIG. 11, block 310). Practical Experiences are encounters where the student performs, in front of an appropriate expert, the task or tasks that the student will perform as part of their job or profession after he or she graduates. In the case of some practical experiences, this performance may educationally happen over a period of time (e.g., a week or month), different students may be assigned to different faculty graders at different times over the span of the entire assessment, and the students may be performing very different tasks in different quantities. Practical experiences may be difficult to quantify because the variables are numerous. The present invention mathematically connects the student assessments that are evaluated by the faculty to the curriculum map.

In some embodiments, the base standard for curriculum mapping is the lecture (e.g., a didactic encounter), which may involve an instructor talking to all students in the course about a topic for a certain amount of time. In such an encounter, one instructor may get the entire credit (e.g., 1 RVU) for lecturing for 15 minutes to everyone in the class. For the Practical Experience encounter, different students may be performing different procedures for different amounts of time.

Figure 12:
FIG. 12 is an example of a user interface for the creation of a record for a practical experience encounter, according to various embodiments described herein.

If focus is given to the assessment of a student's participation in practical experiences, three steps may be performed. First, all of the performed procedures may be assigned microcompetency codes and RVUs. Second, all of the coded procedures may be aggregated for all students over the time span that is evaluated. Third, the instructor who validated that the procedures were completed is identified for each student experience. This is called a Quantitative Skills Assessment, meaning that this is an assessment of the number of points generated for successfully completing a procedure. Note that there can be qualitative modifiers for the RVUs, but that may be a secondary process. FIG. 12 illustrates an example of a user interface 1290 for the creation of a record for a practical experience encounter, according to various embodiments described herein. As illustrated in FIG. 12, the faculty credit for the completed procedures may be directly connected to the Quantitative Skills Assessment of the student. The user interface illustrated in FIG. 12 may link the practical experience of the student directly to the related Quantitative Skills Assessment. There are different types of educational encounters that may take their data directly from an assessment. Examples of these are practical experience from a Quantitative Skills Assessment, and seminar experience that may take its data from a Discussion Assessment. Since the students may all have different experiences, different students may learn different things from different faculty members, in contrast to an educational experience in which every student learns the same thing from the same faculty. The assessments such as those illustrated in FIG. 12 record which faculty members teach what things to which students. This may allow for the creation of "learning objectives" from the recorded assessments.

Inputting the Quantitative Assessment Data

Referring back to FIG. 11, the quantitative assessment data for a given practical experience encounter may be entered and associated with the practical experience record (FIG. 11, block 320). Each procedure may be itemized with the date, student, faculty, microcompetency code, and/or RVUs. FIG. 13 illustrates an example of a user interface 1390 displaying an example set of quantitative assessment data for an example set of practical experiences, according to various embodiments as described herein. As illustrated in FIG. 13, the quantitative assessment data may include the student 1310 performing the task, the instructor 1320 overseeing the task, a microcompetency code 1340 associated with the task, and a number of RVUs 1350 associated with the task. In some embodiments, a tieback ID 1330 may be included. The tieback ID may 1330 indicate a particular or session (e.g. a practical experience encounter) in which the task was completed.

Mathematically Calculating the Faculty Credit

Referring back to FIG. 11, faculty credit may be assigned based on analysis of the completed practical experience quantitative assessment data and the associated faculty (FIG. 11, block 330). This operation may involve two steps. First, for a given instructor, all RVUs for each microcompetency code for each student may be summed for the date range of the assessment. Second, the total RVUs may be divided by the total number of students in the cohort to normalize the number of points for the entire cohort. In some embodiments, there may be a minimum of 0.1 RVUs allocated even if the number of RVUs/students value is a smaller number.

For example, if a given instructor worked with three students out of a cohort of 10 on a single microcompetency code worth 10 RVUs, the instructor would be given credit for 3 RVUs ((10 RVUs*3 students)/10 students in the cohort). FIG. 14 illustrates a user interface 1490 presenting an example allocation of RVUs for instructors for a practical experience encounter (clinical session) with multiple microcompetencies, according to various embodiments as described herein.

Generating Aggregation Reports

Methods, systems, and computer program products according to the present invention may include creating aggregation reports based on the collected data from the various educational encounters (FIG. 1, block 400). FIGS. 15-19 illustrate examples of a user interface displaying example aggregation reports that can be generated from the collected data, according to various embodiments as described herein.

For simplicity sake only, the provided examples only illustrate data associated with practical experiences. However, these same reports may similarly display the RVUs for all faculty members for all encounter types. In some embodiments, the granularity of reports may be related to the curricular level. Higher granularity may occur closest to the actual encounter. The encounters may happen within courses, so the course reports may have a higher granularity. Cohort reports may combine the results from all courses given to a cohort over the multiple years of the cohort's matriculation. Academic Year reports may combine the results across all courses within a calendar academic year. Cross-Cohort reports may compare results for cohorts over time for program analysis. Cross-Academic Year reports may compare results for years over time for program analysis.

Course/Section Encounter Reports

FIG. 15 illustrates an example course/section encounter report 1595. The course encounter reports may aggregate the RVUs for a given course and/or section and map them by the sub-topic of the microcompetency for each instructor. This report may rank the instructors by total RVUs, and may total all RVUs for the course, yielding a percentage participation for each participating faculty member. The left column of the example report is grouped by instructor 1510, with a given code provided for each instructor to protect anonymity. For each instructor, totals for respective types of educational encounters are shown, with a breakdown by topic codes 1520. Though topic codes 1520 are illustrated in FIG. 15, it will be understood that other types of reports (e.g., subtopic-based, microcompetency-based) may be generated without deviating from the present invention. The example report 1595 provided in FIG. 15 may be only a portion of the final aggregated report.

Cohort Encounter Reports

Figure 16:
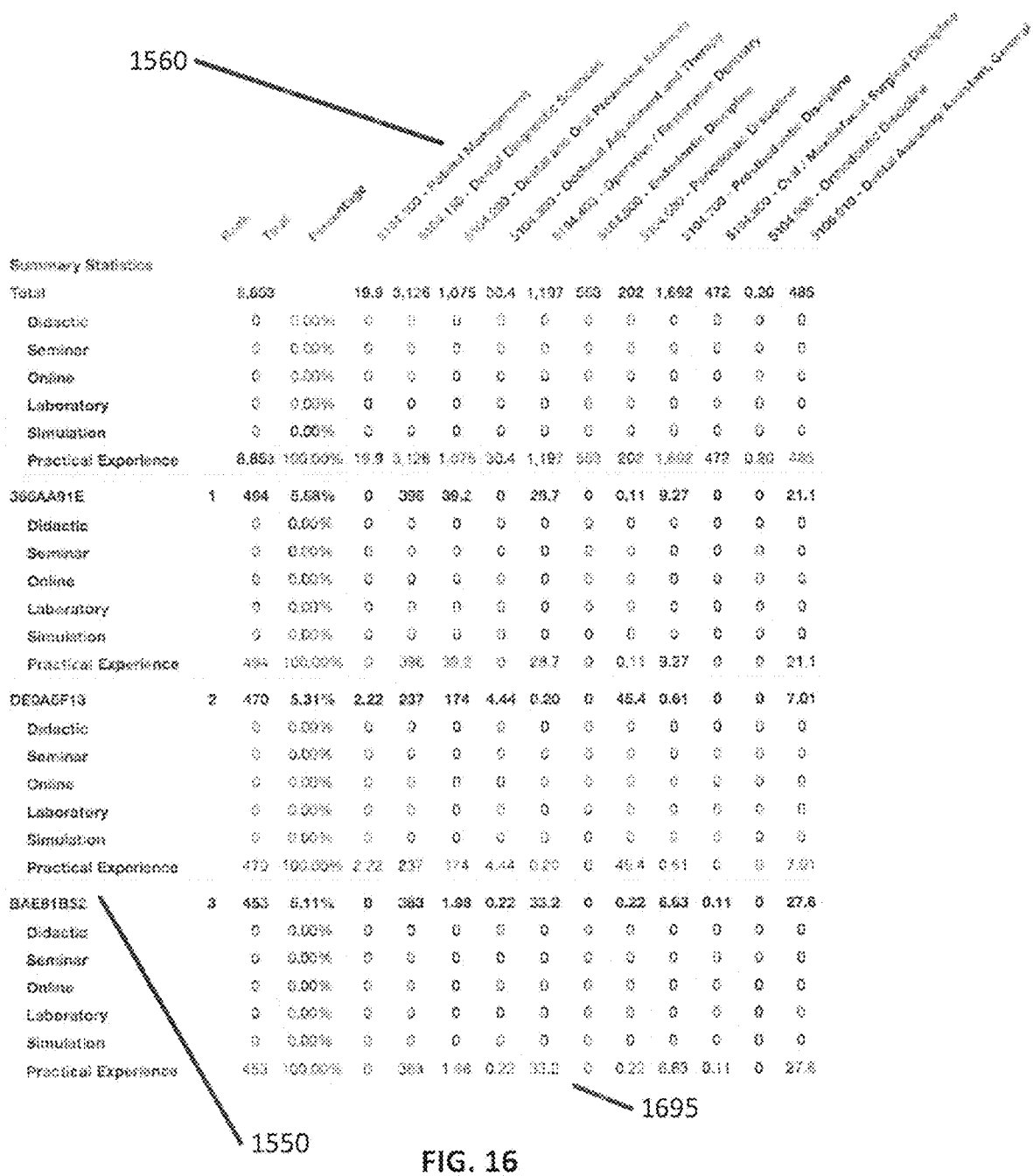

FIG. 16 illustrates an example cohort report 1695. The cohort report may aggregate the encounter RVUs for each instructor for all courses and may map them by topic of the microcompetency for all years of a specific cohort. The cohort report may total all RVUs and may yield a percentage participation for each instructor for program analysis. As in the prior example, the left column of the example report is grouped by instructor 1550, with a given code provided for each instructor to protect anonymity. For each instructor, totals for respective types of educational encounters are shown across the cohort, with a breakdown by topic codes 1560. Though topic codes 1560 are illustrated in FIG. 16, it will be understood that other types of reports (e.g., subtopic-based, microcompetency-based) may be generated without deviating from the present invention. The example report 1695 provided in FIG. 16 may be only a portion of the final aggregated report.

Academic Year Encounter Reports

Figure 17:
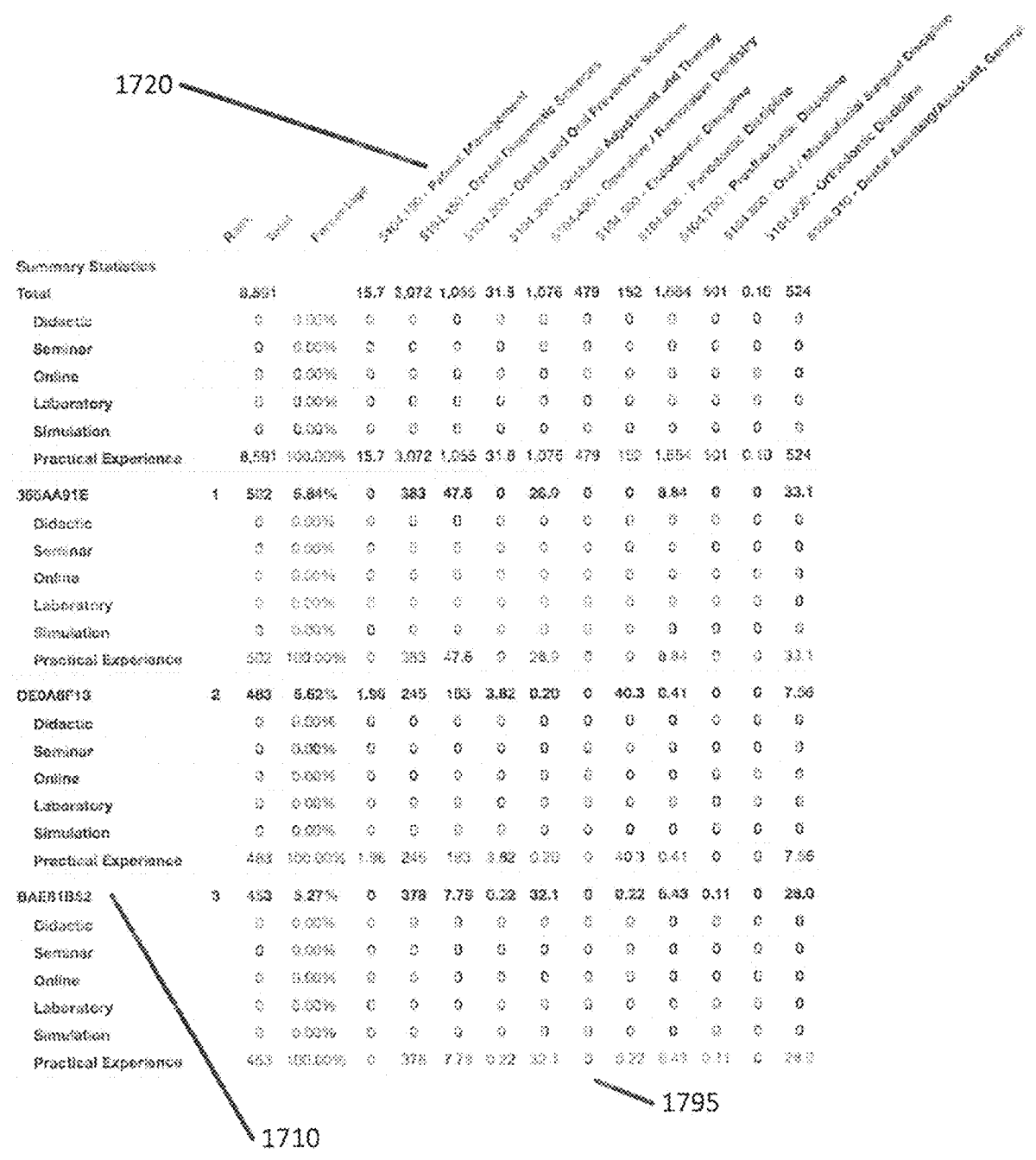

FIG. 17 illustrates an example academic year report 1795. The academic year report may aggregate the encounter RVUs for each instructor for all courses and maps them by topic of the microcompetency for all cohorts during a single academic year. The academic year report may total all RVUs and yield a percentage participation for each instructor for program analysis. As in the prior example, the left column of the example report is grouped by instructor 1710, with a given code provided for each instructor to protect anonymity. For each instructor, totals for respective types of educational encounters are shown across the cohort, with a breakdown by topic codes 1720. Though topic codes 1720 are illustrated in FIG. 17, it will be understood that other types of reports (e.g., subtopic-based, microcompetency-based) may be generated without deviating from the present invention. The example report 1795 provided in FIG. 17 may be only a portion of the final aggregated report.

In some embodiments, cross-cohort and cross-academic year reports may be distinguished because they are specific to the programs and are defined by their competencies. A competency is a collection of microcompetencies that define the ways that the program wants to evaluate success. The competency may be a different metric than the higher-level topics and subtopics.

Cross-Cohort Encounter Reports

Figure 18:
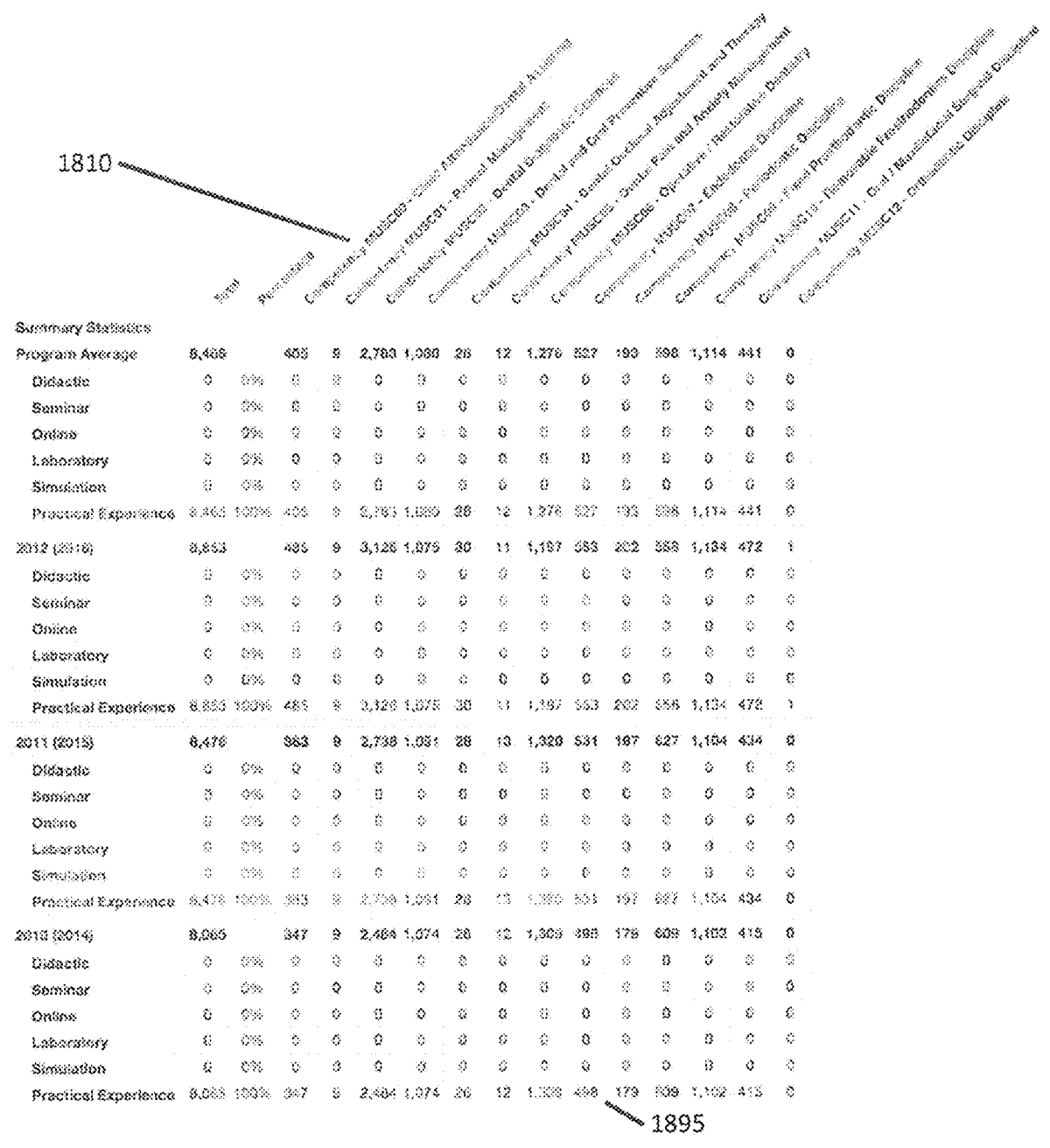

FIG. 18 illustrates an example cross-cohort encounter report 1895. The reports for each cohort may include summations of the RVUs for the different types of educational encounters, and may be mapped to the program competencies 1810 and compared and averaged to allow for evaluation of the curriculum over time. As illustrated in FIG. 18, the cross-cohort report 1895 may compare the program's curriculum from three cohorts (as illustrated in the left column) whose programs began from 2010 to 2012. This report 1895 may provide an ability look at the differences that curriculum changes made in the program during these years.

Cross-Academic Year Encounter Reports

Figure 19:
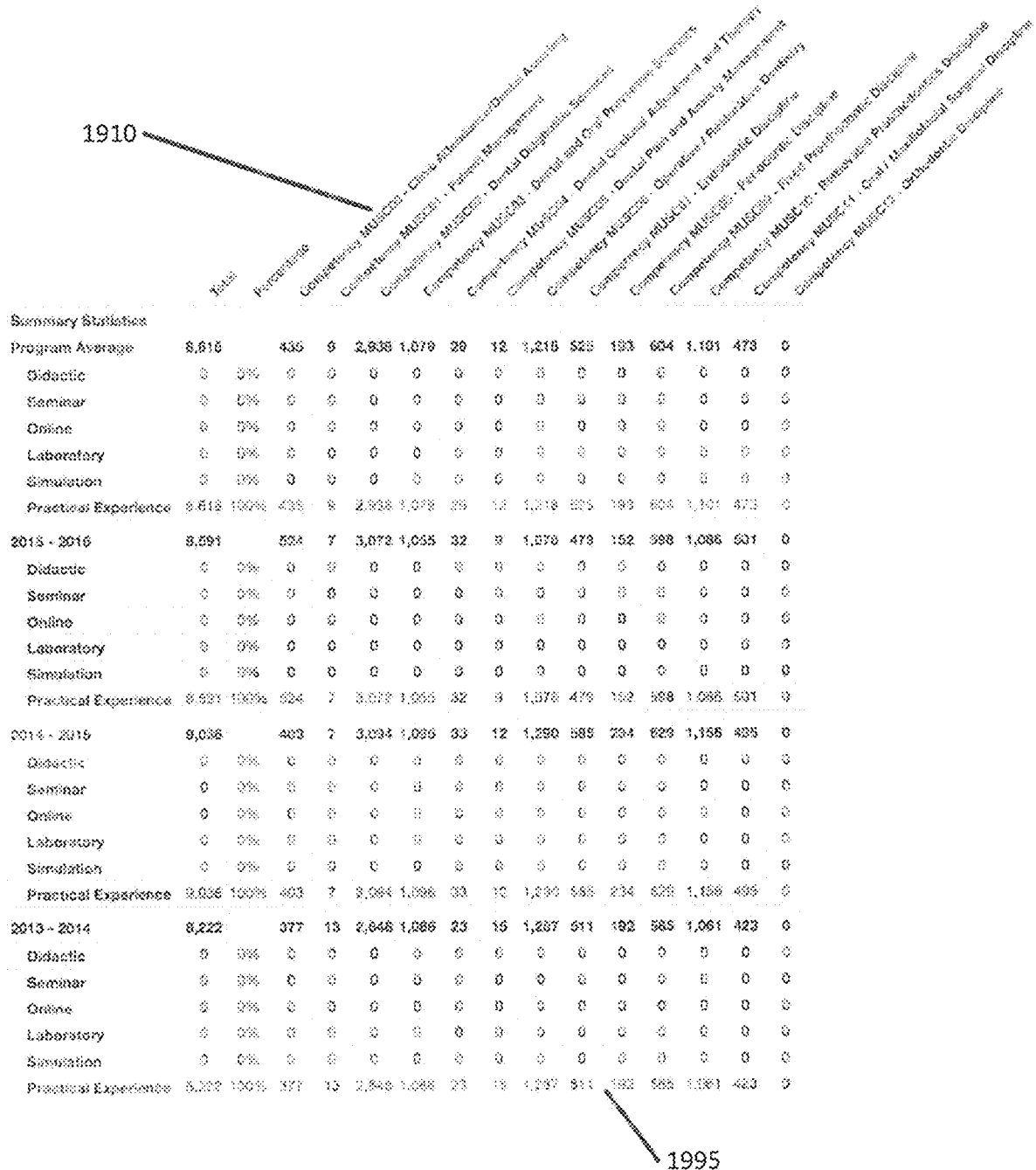

FIG. 19 illustrates an example cross-academic year encounter report 1995. The reports for each academic year may include summations of the RVUs for the different types of educational encounters, and may be mapped to the program competencies 1910 and compared and averaged to allow for evaluation of the curriculum over time. As illustrated in FIG. 19, the report 1995 may compare the program's curriculum from 2013 to 2016 (as illustrated in the left column) during that time span. The curriculum report 1995 may illustrate an allocation of the various types of educational encounters for the entire curriculum with respect to the program competencies 1910, but without regard for the cohort. This report 1995 may provide the ability to look at the differences that specific instructors made in the program during these years.

Figure 20:
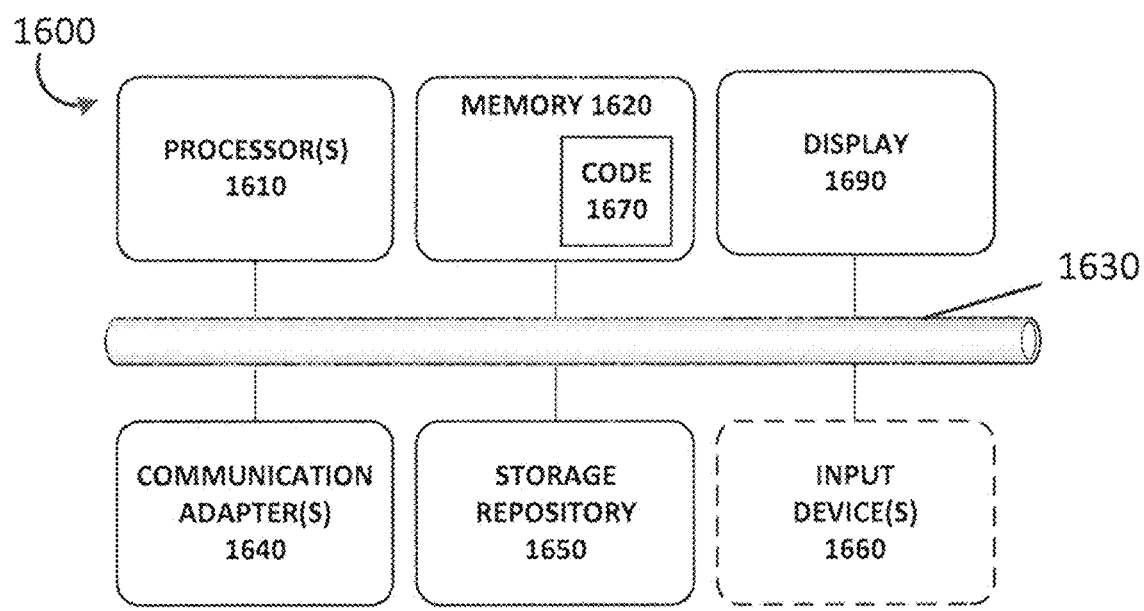
FIG. 20 is a block diagram of an assessment system, according to various embodiments as described herein.

FIG. 20 is a block diagram of an evaluation system 1600 according to some embodiments of the present invention. The evaluation system 1600 may use hardware, software implemented with hardware, firmware, tangible computer-readable storage media having instructions stored thereon and/or a combination thereof, and may be implemented in one or more computer systems or other processing systems. The evaluation system 1600 may also utilize a virtual instance of a computer. As such, the devices and methods described herein may be embodied in any combination of hardware and software.

As shown in FIG. 20, the evaluation system 1600 may include one or more processors 1610 and memory 1620 coupled to an interconnect 1630. The interconnect 1630 may be an abstraction that represents any one or more separate physical buses, point to point connections, or both connected by appropriate bridges, adapters, or controllers. The interconnect 1630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The processor(s) 1610 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks. The processor 1610 may be configured to execute computer program instructions from the memory 1620 to perform some or all of the operations and methods for one or more of the embodiments disclosed herein.

The evaluation system 1600 may also include one or more communication adapters 1640 that may communicate with other communication devices and/or one or more networks, including any conventional, public and/or private, real and/or virtual, wired and/or wireless network, including the Internet. The communication adapters 1640 may include a communication interface and may be used to transfer information in the form of signals between the evaluation system 1600 and another computer system or a network (e.g., the Internet). The communication adapters 1640 may include a modem, a network interface (such as an Ethernet card), a wireless interface, a radio interface, a communications port, a PCMCIA slot and card, or the like. These components may be conventional components, such as those used in many conventional computing devices, and their functionality, with respect to conventional operations, is generally known to those skilled in the art.

The evaluation system 1600 may further include memory 1620 which may contain program code 1670 configured to execute operations associated with the methods described herein. The memory 1620 may include removable and/or fixed non-volatile memory devices (such as but not limited to a hard disk drive, flash memory, and/or like devices that may store computer program instructions and data on computer-readable media), volatile memory devices (such as but not limited to random access memory), as well as virtual storage (such as but not limited to a RAM disk). The memory 1620 may also include systems and/or devices used for storage of the evaluation system 1600.

The evaluation system 1600 may also include on or more input device(s) 1660 such as, but not limited to, a mouse, keyboard, camera, and/or a microphone. The input device(s) 1660 may be accessible to the one or more processors 1610 via the system interconnect 1630 and may be operated by the program code 1670 resident in the memory 1620

The evaluation system 1600 may also include a display 1690 capable of generating a display image, graphical user interface, and/or visual alert. The display 1690 may provide graphical user interfaces for receiving input, displaying intermediate operations/data, and/or exporting output of the methods described herein.

The evaluation system 1600 may also include a storage repository 1650. The storage repository may be accessible to the processor 1610 via the system interconnect 1630 and may additionally store information associated with the evaluation system 1600. For example, in some embodiments, the storage repository 1650 may contain accumulated applicant data, historical outcomes, and/or predictor model data as described herein.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A system for generating a normalized assessment of an instructor in each of a plurality of microcompetencies, the system comprising:
a processor;
a display coupled to the processor; and
a memory coupled to the processor and storing computer readable program code that when executed by the processor causes the processor to perform operations comprising:
calculating a first relative value unit (RVU) score for each of the microcompetencies associated with didactic instruction provided by the instructor;
calculating a second RVU score for each of the microcompetencies associated with at least one of online instruction, seminar instruction, laboratory instruction, and/or simulation instruction provided by the instructor;
calculating a third RVU score for the each of the microcompetencies associated with practical experience instruction provided by the instructor;
generating a normalized score for the instructor for each of the microcompetencies based on the first RVU score, the second RVU score, and the third RVU score; and
displaying, via a graphical interface on the display, the normalized score for the instructor,
wherein the first, second, and third RVU scores are each time-normalized scores,
wherein the instructor is a first instructor of a plurality of instructors, and further comprising:
calculating the normalized score for each of the microcompetencies for each instructor of the plurality of instructors;
automatically generating accreditation data comprising the normalized score for each instructor of the plurality of instructors for each of the microcompetencies; and
providing the accreditation data as part of an accreditation process for an educational institution associated with the plurality of instructors.

2. The system of claim 1, wherein the didactic instruction comprises one or more encounters in which the instructor communicates directly to a plurality of students.

3. The system of claim 1, wherein the online instruction comprises one or more encounters in which a computer is a mechanism for delivery of content to a plurality of students, wherein the seminar instruction comprises one or more encounters in which the seminar instruction guides discussions between one or more experts and the plurality of students, and
wherein the laboratory instruction comprises one or more encounters that places a student of the plurality of students into the role of performing one or more tasks of a skill that augment an understanding of didactic knowledge of the skill.

4. The system of claim 1, wherein the practical experience instruction comprises one or more encounters in which a student performs one or more tasks of a skill on a human patient under conditions corresponding to conditions experienced by those employed to perform the skill.

5. The system of claim 1, wherein the second and third RVU scores are based on a pre-defined assessment of difficulty and an estimated time for a student to complete a respective experiential task.

6. The system of claim 1, wherein calculating the first RVU score for the didactic instruction provided by the instructor comprises:
defining learning objectives for respective ones of a plurality of didactic encounters;
associating the learning objectives of the respective ones of the plurality of the didactic encounters with RVU quantities; and
summing the RVU quantities for the plurality of the didactic encounters to determine the first RVU score.

7. The system of claim 1, wherein calculating the second RVU score for at least one of the online instruction, the seminar instruction, the laboratory instruction, and/or the simulation instruction provided by the instructor comprises:
assigning a percentage credit for the instructor in respective ones of a plurality of online, seminar, laboratory, and/or simulation encounters;
defining learning objectives for the respective ones of the plurality of the online, seminar, laboratory, and/or simulation encounters;
associating the learning objectives of the respective ones of the plurality of the online, seminar, laboratory, and/or simulation encounters with RVU quantities;
for each of the plurality of the online, seminar, laboratory, and/or simulation encounters, determining an allocated RVU quantity for the instructor based on the associated RVU quantities for the learning objectives of the online, seminar, laboratory, and/or simulation encounter and the assigned percentage credit for the instructor in the online, seminar, laboratory, and/or simulation encounter; and
summing the allocated RVU quantities for the instructor for respective ones of the plurality of the online, seminar, laboratory, and/or simulation encounters to determine the second RVU score.

8. The system of claim 1, wherein calculating the third RVU score for the practical experience instruction provided by the instructor comprises:
providing input for quantitative assessment data for respective ones of a plurality of practical experience encounters in which the instructor participates;
calculating practical experience RVUs for the respective ones of the plurality of the practical experience encounters based on the quantitative assessment data; and
summing the practical experience RVUs for the plurality of the practical experience encounters to determine the third RVU score.

9. The system of claim 8, wherein the quantitative assessment data for the respective ones the plurality of the practical experience encounters comprises:
one or more learning objectives associated with at least one skill performed during the practical experience encounter; and
RVU values assigned to respective ones of the learning objectives, and
wherein calculating practical experience RVUs for the respective ones of the plurality of the practical experience encounters based on the quantitative assessment data comprises:
calculating, for each skill of the at least one skill performed during the practical experience encounter, a per-skill RVU value based on a product of a number of students that performed the skill times the RVUs assigned to the one or more learning objectives associated with the skill;
calculating a sum of the per-skill RVU values; and
dividing the sum of the per-skill RVU values by a total number of the students that participated in the practical experience encounter to determine the practical experience RVUs for the practical experience encounter.

10. The system of claim 1, wherein the accreditation data further comprises:
the first RVU score, the second RVU score, and the third RVU score for each instructor of the plurality of instructors.

11. The system of claim 1, wherein the first RVU score, the second RVU score, and the third RVU score for each instructor comprise subtotals based on learning objectives, and
wherein the accreditation data further comprises the subtotals based on the learning objectives for each of the first RVU score, the second RVU score, and the third RVU score.

12. A method for generating a normalized assessment of a plurality of instructors comprising:
for each respective instructor of the plurality of instructors, calculating a first relative value unit (RVU) score for each of a plurality of microcompetencies associated with didactic instruction provided by the respective instructor;
for each respective instructor of the plurality of instructors, calculating a second RVU score for each of the plurality of microcompetencies associated with at least one of online instruction, seminar instruction, laboratory instruction, and/or simulation instruction provided by the respective instructor;
for each respective instructor of the plurality of instructors, calculating a third RVU score for each of the plurality of microcompetencies associated with practical experience instruction provided by the respective instructor;
generating a normalized score for each respective instructor of the plurality of instructors for each of the plurality of microcompetencies based on the first RVU score, the second RVU score, and the third RVU score calculated for each of the plurality of microcompetencies;
automatically generating a normalized listing of the plurality of instructors that provides, for each respective instructor of the plurality of instructors, a relative participation in instruction for each of the plurality of microcompetencies by the respective instructor; and
displaying, via a graphical interface, the normalized listing of the plurality of instructors and/or the normalized score of an instructor of the plurality of instructors,
wherein the first, second, and third RVU scores are each time-normalized scores.

13. The method of claim 12, wherein the didactic instruction comprises one or more encounters in which the instructor communicates directly to a plurality of students.

14. The method of claim 12, wherein the online instruction comprises one or more encounters in which a computer is a mechanism for delivery of content to a plurality of students,
wherein the seminar instruction comprises one or more encounters in which the seminar instruction guides discussions between one or more experts and the plurality of students,
wherein the laboratory instruction comprises one or more encounters that places a student of the plurality of students into the role of performing one or more tasks of a skill that augment an understanding of didactic knowledge of the skill, and
wherein the simulation instruction comprises one or more encounters that places the student of the plurality of students into a role of performing one or more tasks of a skill that simulates work and/or tasks performed by those experienced in the skill.

15. The method of claim 12, wherein practical experience instruction comprises one or more encounters in which a student performs one or more tasks of a skill on a human patient under conditions corresponding to conditions experienced by those employed to perform the skill.

16. The method of claim 12, wherein the second and third RVU scores are based on a pre-defined assessment of difficulty and an estimated time for a student to complete a respective experiential task.

17. The method of claim 12, wherein calculating the first RVU score for the didactic instruction provided by the instructor comprises:
defining learning objectives for respective ones of a plurality of didactic encounters;
associating the learning objectives of the respective ones of the plurality of the didactic encounters with RVU quantities; and
summing the RVU quantities for the plurality of the didactic encounters to determine the first RVU score.

18. The method of claim 12, wherein calculating the second RVU score for at least one of the online instruction, the seminar instruction, the laboratory instruction, and/or the simulation instruction provided by the instructor comprises:
assigning a percentage credit for the instructor in respective ones of a plurality of online, seminar, laboratory, and/or simulation encounters;
defining learning objectives for the respective ones of the plurality of the online, seminar, laboratory, and/or simulation encounters;
associating the learning objectives of the respective ones of the plurality of the online, seminar, laboratory, and/or simulation encounters with RVU quantities;
for each of the plurality of the online, seminar, laboratory, and/or simulation encounters, determining an allocated RVU quantity for the instructor based on the associated RVU quantities for the learning objectives of the online, seminar, laboratory, and/or simulation encounter and the assigned percentage credit for the instructor in the online, seminar, laboratory, and/or simulation encounter; and
summing the allocated RVU quantities for the instructor for respective ones of the plurality of the online, seminar, laboratory, and/or simulation encounters to determine the second RVU score.

19. A computer program product for operating an electronic device comprising a non-transitory computer readable storage medium having computer readable program code embodied in the medium that when executed by a processor causes the processor to perform the operations comprising:
calculating a first relative value unit (RVU) score for each of a plurality of microcompetencies associated with didactic instruction provided by an instructor;

calculating a second RVU score for each of the plurality of microcompetencies associated with at least one of online instruction, seminar instruction, laboratory instruction, and/or simulation instruction provided by the instructor;

calculating a third RVU score for each of the plurality of microcompetencies associated with practical experience instruction provided by the instructor;

generating a respective quantitative assessment of a performance of a student of the instructor in each of the plurality of microcompetencies associated with the practical experience instruction;

adjusting the third RVU score for each of the plurality of microcompetencies based on the respective quantitative assessment for that microcompetency;

automatically generating a normalized score for the instructor for each of the plurality of microcompetencies based on the first RVU score, the second RVU score, and the third RVU score for each of the plurality of microcompetencies; and displaying the normalized score for the instructor on a graphical interface communicatively coupled to the processor, wherein the first, second, and third RVU scores are each time-normalized scores, wherein the instructor is a first instructor of a plurality of instructors, and further comprising:

calculating the normalized score for each of the plurality of microcompetencies for each instructor of the plurality of instructors; and automatically generating data comprising the normalized score for each instructor of the plurality of instructors for each of the plurality of microcompetencies.

20. The method of claim 12, further comprising providing the normalized listing as part of an accreditation process for an educational institution.

* * * * *

UNITED STATES PATENT AND TRADEMARK OFFICE
CERTIFICATE OF CORRECTION

| | | |
|---|---|---|
| PATENT NO. | : 10,878,359 B2 | Page 1 of 1 |
| APPLICATION NO. | : 16/116070 | |
| DATED | : December 29, 2020 | |
| INVENTOR(S) | : Robert Todd Watkins, Jr. | |

It is certified that error appears in the above-identified patent and that said Letters Patent is hereby corrected as shown below:

In the Specification

Column 9, Line 10: Please correct "5104.150.100300" to read -- 5104.150.100.300 --

Column 9, Line 24: Please correct "5104.150.200300" to read -- 5104.150.200.300 --

Signed and Sealed this
First Day of October, 2024

*Katherine Kelly Vidal*

Katherine Kelly Vidal
*Director of the United States Patent and Trademark Office*